US010355834B2

(12) United States Patent
Liu et al.

(10) Patent No.: US 10,355,834 B2
(45) Date of Patent: Jul. 16, 2019

(54) METHOD AND APPARATUS FOR DETERMINING TRANSMISSION TIME-FREQUENCY RESOURCES OF TRAFFIC DATA

(71) Applicant: Alcatel Lucent, Boulogne Billancourt (FR)

(72) Inventors: Yong Liu, Shanghai (CN); Dong Li, Shanghai (CN); Yun Deng, Shanghai (CN)

(73) Assignee: Alcatel Lucent, Nozay (FR)

( * ) Notice: Subject to any disclaimer, the term of this patent is extended or adjusted under 35 U.S.C. 154(b) by 114 days.

(21) Appl. No.: 15/500,755

(22) PCT Filed: Jul. 30, 2015

(86) PCT No.: PCT/IB2015/001484
§ 371 (c)(1),
(2) Date: Jan. 31, 2017

(87) PCT Pub. No.: WO2016/020751
PCT Pub. Date: Feb. 11, 2016

(65) Prior Publication Data
US 2017/0222770 A1 Aug. 3, 2017

(30) Foreign Application Priority Data

Aug. 7, 2014 (CN) .......................... 2014 1 0386255

(51) Int. Cl.
*H04L 5/00* (2006.01)
*H04W 72/04* (2009.01)
(Continued)

(52) U.S. Cl.
CPC ......... *H04L 5/0012* (2013.01); *H04B 1/7143* (2013.01); *H04W 72/044* (2013.01); *H04W 72/1205* (2013.01); *H04W 88/02* (2013.01)

(58) Field of Classification Search
CPC .............. H04L 5/0012; H04W 72/044; H04W 72/1205; H04W 88/02; H04B 1/7143
(Continued)

(56) References Cited

U.S. PATENT DOCUMENTS

| 5,410,538 A | 4/1995 | Roche et al. |
| 2010/0110929 A1* | 5/2010 | Li ........................ H04B 1/7143 370/254 |

(Continued)

FOREIGN PATENT DOCUMENTS

| CN | 102204293 A | 9/2011 |
| CN | 102362473 A | 2/2012 |

OTHER PUBLICATIONS

Alcatel-Lucent Shanghai Bell, "Resource allocation for scheduling assignment," 3GPP, TSG RAN WG1, Meeting #77, R1-142056, 4 pages, Seoul, Korea, May 19-23, 2014.
(Continued)

*Primary Examiner* — Brian T O Connor
(74) *Attorney, Agent, or Firm* — Fay Sharpe LLP

(57) ABSTRACT

The invention provides a method of determining transmission time-frequency resources of traffic data in a wireless communication network. The network device determines a time-domain transmission pattern $P_{i,j}$ of the traffic data from a time-domain transmission pattern set $P_{I,j}$; determines a frequency hopping pattern of the traffic data based on a frequency hopping matrix and a first rule, wherein the frequency hopping matrix is constructed by one or more Latin squares, a number of rows of the frequency hopping matrix is equal to a number of sub-bands in a frequency hopping bandwidth, each element in a row of the frequency hopping matrix successively represents a frequency hopping order of the complement transmission patterns $P_{i,j}$ and $P_{i,j'}$, a number of columns of the frequency hopping matrix is equal to a number of transmissions of the traffic data, and the
(Continued)

first rule is $P_{i,j}$ and $P_{i,j'}$ are assigned with a same channel within a sub-band and a value of j is a part of J or all of J, the complement transmission patterns $P_{i,j}$ and $P_{i,j'}$ in the transmission pattern subset $P_{i,J}$ are assigned with a same channel within a sub-band and use a same sub-band for their first transmission, the non-complement transmission patterns $P_{i,j}$ and $P_{i,k}$ in the transmission pattern subset $P_{i,J}$ have a same relative location in each sub-band and the non-complement transmission pattern subsets $P_{i,J}$ and $P_{s,J}$ are assigned with the different channels within a sub-band; and sends the traffic data according to the time-domain transmission pattern $P_{i,j}$ and the frequency hopping pattern.

14 Claims, 14 Drawing Sheets

(51) Int. Cl.
    *H04W 72/12*     (2009.01)
    *H04W 88/02*     (2009.01)
    *H04B 1/7143*     (2011.01)

(58) Field of Classification Search
    USPC .......................................................... 370/330
    See application file for complete search history.

(56) References Cited

U.S. PATENT DOCUMENTS

2012/0002740 A1    1/2012    Han et al.
2017/0230937 A1*    8/2017    Nguyen ................ H04W 72/02

OTHER PUBLICATIONS

Alcatel-Lucent Shanghai Bell et al., "Resource allocation for D2D broadcast communication," 3$^{rd}$ Generation Partnership Project (3GPP), TSG RAN WG1, R1-142055, XP050789175, 5 pages, Seoul, Korea, May 19-23, 2014.
LG Electronics, "Discussion on Resource Allocation in D2D Communications," 3$^{rd}$ Generation Partnership Project (3GPP), TSG RAN WG1 Meeting #75, R1-135481, XP050735154, pp. 1-15, San-Francisco, USA, Nov. 11-15, 2013.
Fujitsu, "RPT design for D2D communication," 3$^{rd}$ Generation Partnership Project (3GPP), TSG RAN WG1 Meeting #78, R1-142929, XP050815326, pp. 1-7, Dresden, Germany, Aug. 18-22, 2014.
International Search Report for PCT/IB2015/001484 dated Mar. 17, 2016.

\* cited by examiner $$\begin{array}{c} P_{i,1}, P_{i,1'} \\ P_{i,2}, P_{i,2'} \\ P_{i,3}, P_{i,3'} \\ P_{i,4}, P_{i,4'} \end{array} \begin{bmatrix} 0 & 1 & 2 & 3 \\ 1 & 0 & 3 & 2 \\ 2 & 3 & 0 & 1 \\ 3 & 2 & 1 & 0 \end{bmatrix}$$

transmission subframe: 1  2  3  4

$$\begin{array}{r} \text{Pi,1, Pi,1'} \\ \text{Pi,2, Pi,2'} \\ \text{Pi,3, Pi,3'} \\ \text{Pi,4, Pi,4'} \end{array} \begin{bmatrix} 0 & 2 & 3 & 1 \\ 1 & 3 & 0 & 2 \\ 2 & 0 & 1 & 3 \\ 3 & 1 & 2 & 0 \end{bmatrix}$$

transmission sub-frame: 1 2 3 4

$$\begin{array}{c} P_{i,m}, P_{i,m'} \\ P_{i,n}, P_{i,n'} \\ \text{transmission} \\ \text{sub-frame:} \end{array} \begin{bmatrix} 0 & 1 & \vdots & 0 & 1 \\ 1 & 0 & \vdots & 1 & 0 \end{bmatrix}$$
$$\phantom{xxxxxxxxxxxxxxx} 1 \phantom{x} 2 \phantom{xx} 3 \phantom{xx} 4$$

$$W_4: \begin{bmatrix} +1 & +1 & +1 & +1 \\ +1 & -1 & +1 & -1 \\ +1 & +1 & -1 & -1 \\ +1 & -1 & -1 & +1 \end{bmatrix} \quad W_4' = -1 \times W_4: \begin{bmatrix} -1 & -1 & -1 & -1 \\ -1 & +1 & -1 & +1 \\ -1 & -1 & +1 & +1 \\ -1 & +1 & +1 & -1 \end{bmatrix}$$

Sub-frame group: 1 2 3 4     Sub-frame group: 1 2 3 4

$$E_2 \begin{bmatrix} 1 & 1 \\ 1 & 0 \end{bmatrix} \quad E_2' \begin{bmatrix} 0 & 0 \\ 0 & 1 \end{bmatrix}$$

$$\begin{array}{c} P_{i,m},\ P_{i,m'} \\ P_{i,n},\ P_{i,n'} \\ \text{transmission} \\ \text{sub-frame:} \end{array} \begin{bmatrix} 0 & 1 \\ 1 & 0 \\ 1 & 2 \end{bmatrix}$$

US 10,355,834 B2

METHOD AND APPARATUS FOR DETERMINING TRANSMISSION TIME-FREQUENCY RESOURCES OF TRAFFIC DATA

FIELD OF THE INVENTION

The present invention relates to communication technologies, and particularly to a method and an apparatus for determining the transmission time-frequency resources of the traffic data in the wireless communication network.

BACKGROUND OF THE INVENTION

Device-to-device (D2D) communication has been introduced as an important enhancement to LTE-Advanced (Long Term Evolution) for cellular networks. The related standardization has been carried out in 3GPP (Third-Generation Partnership Project) to study both D2D discovery and direct communication techniques.

For D2D direct communications, broadcast communication in out-of-coverage scenario is prioritized for Release 12. It is the most critical task for D2D broadcast communication to support VoIP traffic and increase coverage. To increase coverage, narrow band (as low as 2 or 3 RBs) is a suitable choice for transmission of a broadcast VoIP packet. For a large channel bandwidth (50 RBs for 10 MHz bandwidth), we need to FDM (frequency domain multiplexing) broadcast transmissions from multiple UEs to fully use available spectral resources. However, it incurs half-duplex constraint and in-band emissions which eventually impact reception performance of the receiver.

SUMMARY OF THE INVENTION

In 3GPP discussion, there are companies proposing random frequency hopping by broadcast UEs. At the selected sub-frames (time domain), a broadcast UE randomly selects RBs (resource blocks) in frequency domain for transmission of a VoIP packet. Random frequency hopping mechanism is simple; however, it can't use up all the allocated resource for D2D broadcast communication and there exist collisions between transmissions from multiple broadcast UEs. Hence, there is a need of providing new frequency hopping patterns so as to provide a new solution to determine transmission time-frequency resources of traffic data.

Based on above concerns, according to one aspect of the invention, in one embodiment, there is provided a method of determining transmission time-frequency resources of traffic data in a network device of a wireless communication network, the method comprising:

A. determining a time-domain transmission pattern $P_{i,j}$ of the traffic data from a time-domain transmission pattern set $P_{I,J}$, wherein $i \in I$, $j \in J$, $P_{i,j}$ and $P_{i',j}$ are complement transmission pattern subsets, $P_{i,j}$ and $P_{i,j'}$ are complement transmission patterns within the transmission pattern subset $P_{i,J}$, $P_{i,j}$ and $P_{i,k}$ are non-complement transmission patterns within the transmission pattern subset $P_{i,J}$ and $j \neq k$, and $P_{i,J}$ and $P_{s,J}$ are non-complement transmission pattern subsets and $i \neq s$;

B. determining a frequency hopping pattern of the traffic data based on a frequency hopping matrix and a first rule, wherein the frequency hopping matrix is constructed by one or more Latin squares, a number of rows of the frequency hopping matrix is equal to a number of sub-bands in a frequency hopping bandwidth, each element in a row of the frequency hopping matrix successively represents a frequency hopping order of the complement transmission patterns $P_{i,j}$ and $P_{i,j'}$, a number of columns of the frequency hopping matrix is equal to a number of transmissions of the traffic data, and the first rule is $P_{i,j}$ and $P_{i,j'}$ are assigned with a same channel within a sub-band and a value of j is a part of J or all of J, the complement transmission patterns $P_{i,j}$ and $P_{i,j'}$ in the transmission pattern subset $P_{i,J}$ are assigned with a same channel within a sub-band and use a same sub-band for their first transmission, the non-complement transmission patterns $P_{i,j}$ and $P_{i,k}$ in the transmission pattern subset $P_{i,J}$ have a same relative location in each sub-band and the non-complement transmission pattern subsets $P_{i,J}$ and $P_{s,J}$ are assigned with the different channels within a sub-band;

C. sending the traffic data according to the time-domain transmission pattern $P_{i,j}$ and the frequency hopping pattern.

Advantageously, the step A comprises:
dividing N sub-frames into M sub-frame groups evenly;
determining a first transmission pattern set, the first transmission pattern set including all rows in a first matrix $H_1$ and a second matrix $H_2$ except for their first rows, wherein the second matrix $H_2$ is a product of the first matrix $H_1$ and −1, and the first matrix has M columns;
determining a second transmission pattern set, the second transmission pattern set including a third matrix $H_3$ and a fourth matrix $H_4$, wherein the fourth matrix $H_4$ and the third matrix $H_3$ are complementary, and each row in the first transmission pattern set and each row in the second transmission pattern set are combined respectively to constitute the time-domain transmission pattern set $P_{I,J}$;
selecting one row from the first transmission pattern set and one row from the second transmission pattern set to determine the time-domain transmission pattern $P_{i,j}$ of the traffic data;
wherein the first transmission pattern set is used for determining transmission sub-frame groups and reception sub-frame groups, and the second transmission pattern set is used for determining transmission sub-frames within each transmission sub-frame group.

Advantageously, the non-complement transmission patterns $P_{i,j}$ and $P_{i,k}$ use a same frequency hopping order or different frequency hopping orders.

Advantageously, relative locations of frequency hopping of the complement transmission patterns $P_{i,j}$ and $P_{i,j'}$ within each sub-band are same.

Advantageously, the frequency hopping matrix and the first rule are pre-configured in the network device.

Advantageously, the method further comprises the step of: sending information about the time-domain transmission pattern $P_{i,j}$ of the traffic data and frequency information about a first transmission of the traffic data to other network devices.

Advantageously, the method further comprises the step of: sending information about the time-domain transmission pattern $P_{i,j}$ of the traffic data and frequency information about each of a plurality of transmissions of the traffic data to other network devices.

According to another aspect of the invention, in one embodiment, there is provided a n apparatus for determining transmission time-frequency resources of traffic data in a network device of a wireless communication network, the apparatus comprising:

a first determining unit for determining a time-domain transmission pattern $P_{i,j}$ of the traffic data from a time-domain transmission pattern set $P_{I,J}$, wherein $i \in I$, $j \in J$, $P_{i,J}$ and $P_{i',J}$ are complement transmission pattern subsets, $P_{i,j}$ and $P_{i,j'}$ are complement transmission patterns within the transmission pattern subset $P_{i,j'}$, $P_{i,j}$ and $P_{i,k}$ are non-complement transmission patterns within the transmission pattern subset $P_{i,j}$ and $j \ne k$, and $P_{i,j}$ and $P_{s,j}$ are non-complement transmission pattern subsets and $i \ne s$;

a second determining unit for determining a frequency hopping pattern of the traffic data based on a frequency hopping matrix and a first rule, wherein the frequency hopping matrix is constructed by one or more Latin squares, a number of rows of the frequency hopping matrix is equal to a number of sub-bands in a frequency hopping bandwidth, each element in one row of the frequency hopping matrix successively represents a frequency hopping order of the complement transmission patterns $P_{i,j}$ and $P_{i,j'}$, a number of columns of the frequency hopping matrix is equal to a number of transmissions of the traffic data, and the first rule is $P_{i,j}$ and $P_{i,j'}$ are assigned with a same channel within a sub-band and a value of j is a part of J or all of J, the complement transmission patterns $P_{i,j}$ and $P_{i,j'}$ in the transmission pattern subset $P_{i,j}$ are assigned with a same channel within a sub-band and use a same sub-band for their first transmission, the non-complement transmission patterns $P_{i,j}$ and $P_{i,k}$ in the transmission pattern subset $P_{i,j}$ have a same relative location in each sub-band and the non-complement transmission pattern subsets $P_{i,j}$ and $P_{s,j}$ are assigned with different channels within a sub-band;

a first sending unit for sending the traffic data according to the time-domain transmission pattern $P_{i,j}$ and the frequency hopping pattern.

Advantageously, the first determining unit is used for:
dividing N sub-frames into M sub-frame groups evenly;
determining a first transmission pattern set, the first transmission pattern set including all rows in a first matrix $H_1$ and a second matrix $H_2$ except for their first rows, wherein the second matrix $H_2$ is a product of the first matrix $H_1$ and −1, and the first matrix has M columns;
determining a second transmission pattern set, the second transmission pattern set including a third matrix $H_3$ and a fourth matrix $H_4$, wherein the fourth matrix $H_4$ and the third matrix $H_3$ are complementary, and each row in the first transmission pattern set and each row in the second transmission pattern set are combined respectively to constitute the time-domain transmission pattern set $P_{I,J}$;
selecting one row from the first transmission pattern set and one row from the second transmission pattern set to determine the time-domain transmission pattern $P_{i,j}$ of the traffic data;
wherein the first transmission pattern set is used for determining transmission sub-frame groups and reception sub-frame groups, and the second transmission pattern set is used for determining transmission sub-frames within each transmission sub-frame group.

Advantageously, the non-complement transmission patterns $P_{i,j}$ and $P_{i,k}$ use a same frequency hopping order or different frequency hopping orders.

Advantageously, relative locations of frequency hopping of the complement transmission patterns $P_{i,j}$ and $P_{i,j'}$ within each sub-band are same.

Advantageously, the frequency hopping matrix and the first rule are pre-configured in the network device.

Advantageously, the first sending unit is further used for sending information about the time-domain transmission pattern $P_{i,j}$ of the traffic data and frequency information about a first transmission of the traffic data to other network devices.

Advantageously, the first sending unit is further used for sending information about the time-domain transmission pattern $P_{i,j}$ of the traffic data and frequency information about each of a plurality of transmissions of the traffic data to other network devices.

The respective aspects of the invention will become more apparent from the following description of particular embodiments thereof.

BRIEF DESCRIPTION OF DRAWINGS

Other features, objects and advantages of the invention will become more apparent upon review of the following detailed description of non-limiting embodiments taken with reference to the drawings in which.

Identical or similar devices (modules) or steps will be denoted by identical or similar reference numerals throughout the drawings.

DETAILED DESCRIPTION OF EMBODIMENTS

In the following, the preferred embodiments of the present invention will be described in great details with reference to the accompanying drawings. Although the drawings show the preferred embodiments of the present invention, it shall be appreciated that the present invention may be implemented in various forms and it should not be limited to the embodiments herein. Rather, providing these embodiments is to make the present invention more thorough and complete and is able to entirely convey the scope of the invention to those skilled in the art.

Hereinafter, the respective embodiments of the invention will be described using D2D communication as example. It shall be appreciated that the technical solutions of the invention are not limited to D2D communication, but could be applicable to any other communication between network devices using the technical solutions of the invention.

The design for D2D broadcast communication should consider the following factors.

First, we need to reuse LTE frame structure to keep compatibility with legacy cellular communications.

1. In LTE, spectral resources are partitioned in time-frequency plane.

2. In LTE, the minimum scheduling (resource allocation) unit consists of two time-consecutive resource blocks within one sub-frame, which is referred to as a resource-block (RB) pair. The resource allocation unit for D2D broadcast communication should be multiple of RB pairs.

Second, the design for D2D broadcast communication should suit the basic traffic type for D2D communication, for example VoIP (Voice over IP) traffic. The VoIP traffic has at least the following characteristics.

1. VoIP traffic is periodical. The encoder frame length is 20 ms which means a voice encoder generates a voice packet for each 20 ms.

2. The end-to-end delay requirement for VoIP traffic is 200 ms. Subtracting the processing time, the allowed transmission delay for VoIP packet of D2D communication (one-way) is about 160 ms.

Based on link level simulations, 4 transmissions of a VoIP packet are sufficient to satisfy the SINR (Signal to Interference and Noise Ratio) requirement for −107 dBm receiver reference sensitivity.

In the following, methods of the user equipment (UE) determining transmission patterns in time domain will be described.

Figures 1, 2, 3:
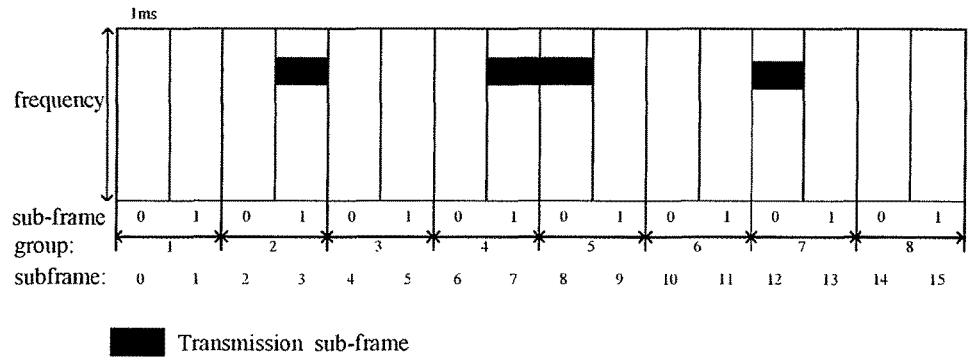
FIG. 1 illustrates a schematic view of a sub-frame group according to one embodiment of the invention.
FIG. 2 illustrates a schematic view of constructing a Walsh matrix-based first transmission pattern set according to one embodiment of the invention.
FIG. 3 illustrates a schematic view of a second transmission pattern set according to one embodiment of the invention.

First, UE divides N sub-frames into M sub-frame groups evenly. For example, as shown in FIG. 1, 16 sub-frames in total can be used for transmission of user data (e.g., D2D user data), then N=16. 16 sub-frames are divided into M=8 sub-frame groups evenly. In this way, each sub-frame group consists of 2 sub-frames.

Then, UE determines a first transmission pattern set. The first transmission pattern set includes all rows in a first matrix $H_1$ and a second matrix $H_2$ except for their first rows, wherein the second matrix $H_2$ is the product of the first matrix $H_1$ and −1, and the first matrix has M=8 columns. The first transmission pattern subset can be pre-configured in UE.

For example, as shown in FIG. 2, the first matrix can be a 8×8 Walsh matrix $W_8$ and the second matrix can be a 8×8 Walsh matrix $W_8'$. The second matrix $W_8'$ is derived from the exemplary first matrix $W_8$ multiplying −1. As the first row of the first matrix $W_8$ or the second matrix $W_8'$ is all +1 or −1, which cannot indicate the transmission and reception slots in D2D communication effectively, the first row is excluded. Moreover, the fifth rows of both the first matrix $W_8$ and the second matrix $W_8'$ can be excluded since there are 4 consecutive transmissions (i.e., +1) in the fifth row which may impact time diversity. Except for their respective first row and fifth row in the first matrix $W_8$ and the second matrix $W_{8'}$, each element in the first matrix and the second matrix represents the transmission sub-frame group and the reception sub-frame group. The first transmission pattern set includes the first matrix $W_8$ and the second matrix $W_{8'}$, that is, the first transmission pattern set includes 12 kinds of transmission rows in total.

When the element in the transmission row of the first matrix $H_1$ and the second matrix $H_2$ is equal to a first value (e.g., +1), the sub-frame group corresponding to the position of the element is the transmission sub-frame group. When the element in the transmission row of the first matrix $H_1$ and the second matrix $H_2$ is equal to a second value (e.g., −1), the sub-frame group corresponding to the position of the element is the reception sub-frame group.

Then, UE determines a second transmission pattern set. The second transmission pattern set includes a third matrix $H_3$ and a fourth matrix $H_4$, wherein the fourth matrix $H_4$ and the third matrix $H_3$ are complementary. The second transmission pattern subset can be pre-configured in UE.

The sub-frames indicated by the elements in the sub-frame rows of the third matrix $H_3$ or the fourth matrix $H_4$ are the transmission sub-frames, and the other sub-frames in the transmission sub-frame group is the reception sub-frames. The transmission sub-frames and the reception sub-frames are located in the transmission sub-frame group. For example, the second transmission pattern set includes the third matrix $E_4$ and the fourth matrix $E_4'$ as shown in FIG. 3, that is, the second transmission pattern set includes 8 transmission rows in total.

For example, as shown in FIG. 3, the value of the third row and the first column of the third matrix $E_4$ is equal to 1, the sub-frames with index being 1 for example in the corresponding transmission sub-frame group are the transmission sub-frames, while the other sub-frames with index being 0 for example in the transmission sub-frame group are the reception sub-frames. For another example, as shown in FIG. 3, the value of the third row and the third column of the third matrix $E_4$ is equal to 0, the sub-frames with index being 0 for example in the corresponding transmission sub-frame group are the transmission sub-frames, while the other sub-frames with index being 1 for example in the transmission sub-frame group are the reception sub-frames.

Each row in the first transmission pattern set and each row in the second transmission pattern set are utilized cooperatively to constitute a whole time-domain transmission pattern set $P_{I, J}$. For example, the first transmission pattern set includes 12 kinds of transmission rows and the second transmission pattern set includes 8 kinds of sub-frame rows; thus the whole time-domain transmission pattern set $P_{I, J}$ includes 96 kinds of time-domain transmission patterns in total.

For the traffic data to be transmitted, UE selects a transmission row from the first transmission pattern set and a sub-frame row from the second transmission pattern set, that is, UE selects a time-domain transmission pattern from the whole time-domain transmission pattern set $P_{I, J}$ to determine a time-domain transmission pattern $P_{i, j}$ of the traffic data.

For example, in the case of the first transmission pattern set being Walsh matrix $W_8$ and $W_8'$ as shown in FIG. 2 and the second transmission pattern set being matrix $E_4$ and $E_4'$ as shown in FIG. 3, $i \in \{2,3,4,6,7,8\} \cup \{2',3',4',6',7',8'\}$, $j \in \{1,2,3,4\} \cup \{1',2',3',4'\}$. If $i \in \{2,3,4,6,7,8\}$, then the $i^{th}$ row in $W_8$ is used for construction of the time-domain transmission pattern. If $i \in \{2',3',4',6',7',8'\}$, then the $i^{th}$ row in $W_8'$ is used for construction of the time-domain transmission pattern. Similarly, if $j \in \{1,2,3,4\}$, then the $j^{th}$ row in $E_4$ is used for construction of the time-domain transmission pattern. If $j \in \{1',2',3',4'\}$, then the $j^{th}$ row in $E_4'$ is used for construction of the time-domain transmission pattern.

In the whole time-domain transmission pattern set $P_{I, J}$, $P_{i, J}$ denotes a transmission pattern subset with i fixed and $J=\{1,2,3,4\} \cup \{1',2',3',4'\}$. For example, $P_{3, J}$ represents a subset with 8 transmission patterns $\{P_{3,1}, P_{3,2}, P_{3,3}, P_{3,4}, P_{3,1'}, P_{3,2'}, P_{3,3'}, P_{3,4'}\}$. $P_{i, j}$ and $P_{i', j}$ are complement transmission pattern subsets. Within a transmission pattern subset $P_{i, J}$, $P_{i, j}$ and $P_{i, j'}$ are complement transmission patterns, and $P_{i, j}$ and $P_{i, k}$ are non-complement transmission patterns ($j \neq k$). $P_{i, j}$ and $P_{s, j}$ are non-complement transmission pattern subsets ($i \neq s$).

The way to construct the first transmission pattern set and the second transmission pattern set to obtain the whole time-domain transmission pattern set $P_{I, J}$ and to determine the time-domain transmission pattern $P_{i, j}$ of the traffic data therefrom is described above; those skilled in the art shall be appreciated that the way to obtain the whole time-domain transmission pattern set $P_{I, J}$ by constructing the first transmission pattern set and the second transmission pattern set is just an exemplary embodiment, and other suitable ways to obtain the whole time-domain transmission pattern set $P_{I, J}$ are also applicable to the technical solution of the present invention as long as the respective transmission patterns in the constructed whole time-domain transmission pattern set $P_{I, J}$ satisfies the following conditions: $P_{i, j}$ and $P_{i', j}$ are complement transmission pattern subsets, $P_{i, j}$ and $P_{i, j'}$ are complement transmission patterns within the transmission pattern subset $P_{i, J}$, $P_{i, j}$ and $P_{i, k}$ are non-complement transmission patterns within the transmission pattern subset $P_{i, J}$ and $j \neq k$, and $P_{i, j}$ and $P_{s, j}$ are non-complement transmission pattern subsets and $i \neq s$.

In the following, the method of determining the transmission time-frequency resources for the traffic data according to the respective embodiments of the present invention will be described in details.

Figure 4:
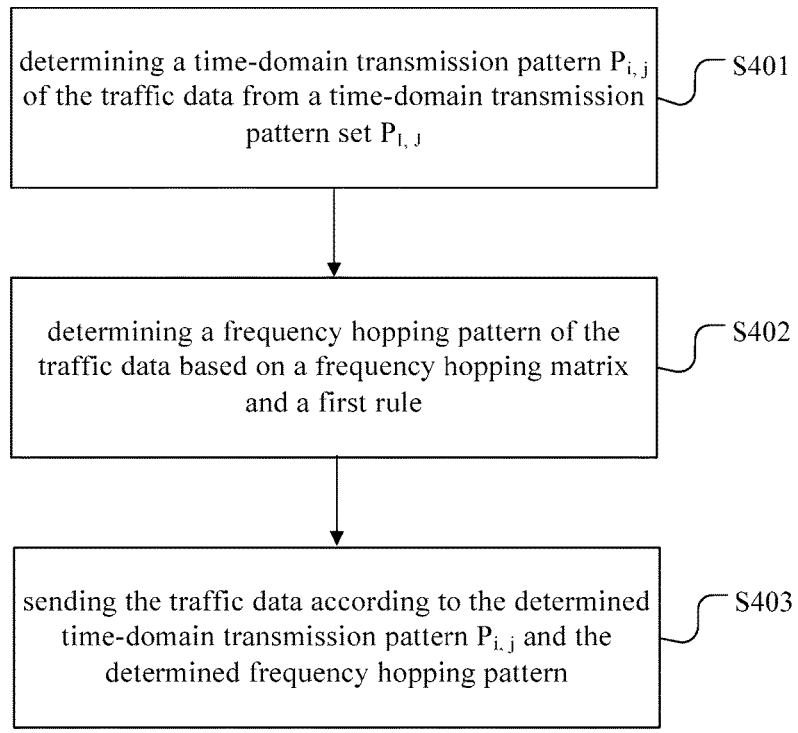
FIG. 4 illustrates a flow chart of a method of determining transmission time-frequency resources of the traffic data according to one embodiment of the invention.

Referring to FIG. 4, in step S401, UE determines a time-domain transmission pattern $P_{i, j}$ of the traffic data from the determined time-domain transmission pattern set $P_{I, J}$. Such a step can be achieved by the above embodiment, for example.

In step S401, UE determines a frequency hopping pattern of the traffic data based on a frequency hopping matrix and a first rule. For example, the frequency hopping matrix and the first rule can be pre-configured in UE.

In step S403, UE sends the traffic data according to the determined time-domain transmission pattern $P_{i, j}$ and the determined frequency hopping pattern.

Advantageously, after the step S402, UE may send information about the time-domain transmission pattern $P_{i, j}$ of the traffic data and the frequency information about the first transmission of the traffic data to other network devices. The frequency information can be the absolute location information in the frequency hopping bandwidth or the sub-band number information and the relative location information corresponding to the sub-band in the frequency hopping bandwidth.

Moreover, if the corresponding reception network device does not store the related information such as frequency hopping matrix, UE may also send information about the time-domain transmission pattern $P_{i, j}$ of the traffic data and the frequency information about each of multiple transmissions of the traffic data to the reception network device.

For step S402, the frequency hopping matrix therein can be constructed by one or more Latin squares, the number of rows of the frequency hopping matrix is equal to the number of sub-bands in the frequency hopping bandwidth, and the number of columns of the frequency hopping matrix is equal to the number of transmissions of the traffic data. It shall be appreciated that if the number of sub-bands in the frequency hopping bandwidth is equal to the number of transmissions of the traffic data, for example, if the number of sub-bands is 4 and the number of transmissions of the traffic data, then the frequency hopping matrix is constructed by a 4×4 Latin square. If the number of sub-bands in the frequency hopping bandwidth is not equal to the number of transmissions of the traffic data, for example, if the number of sub-bands is 2 and the number of transmissions of the traffic data, then the frequency hopping matrix is constructed by two 2×2 Latin squares.

Each element in a row of the frequency hopping matrix successively represents the frequency hopping orders of complement transmission patterns $P_{i, j}$ and $P_{i, j'}$. For example, the frequency hopping orders of the complement transmission patterns $P_{3, 1}$ and $P_{3, 1'}$ are denoted by the frequency hopping matrix, that is, respective elements in the first row of the Latin square. The first element in the first row of the Latin square represents which sub-band is used for the first transmission of the complement transmission patterns $P_{3, 1}$ and $P_{3, 1'}$, the second element represents which sub-band is used for the second transmission, that is, frequency hopping to which sub-band from the current sub-band, and so forth. For another example, the frequency hopping orders of the complement transmission patterns $P_{3,2}$ and $P_{3,2'}$ are denoted by the frequency hopping matrix, that is, respective elements in the second row of the Latin square. The first element in the second row of the Latin square represents which sub-band is used for the first transmission of the complement transmission patterns $P_{3,2}$ and $P_{3,2'}$, the second element represents which sub-band is used for the second transmission, that is, frequency hopping to which sub-band from the current sub-band, and so forth. Likely, the complement transmission patterns $P_{3,3}$ and $P_{3,3'}$ and the complement transmission patterns $P_{3,4}$ and $P_{3,4'}$ perform frequency hopping respectively according to respective elements in the third row and fourth row of the frequency hopping matrix. It shall be appreciated that each element in each row of the Latin square only appears once and each element in each column only appears once, thus during the frequency hopping, there is no collision between any two transmission patterns.

The construction of the frequency hopping matrix and the examples will be embodied in the following embodiments.

For step S402, the first rule therein is:

$P_{i,j}$ and $P_{i,j'}$ are assigned with the same channel within a sub-band and the value of j is a part of or all of J;

the complement transmission patterns $P_{i,j}$ and $P_{i,j'}$ in the transmission pattern subset $P_{i,J}$ are assigned with the same channel within a sub-band and use the same sub-band for the first transmission;

the non-complement transmission patterns $P_{i,j}$ and $P_{i,k}$ in the transmission pattern subset $P_{i,J}$ have the same relative location in each sub-band;

the non-complement transmission pattern subsets $P_{i,J}$ and $P_{s,J}$ are assigned with the different channels within a sub-band.

For each transmission pattern in the whole time-domain transmission pattern subset $P_{I,J}$, only when the first rule is satisfied and each transmission pattern performs frequency hopping based on the frequency hopping matrix (i.e., Latin square) can all sub-bands be used up for transmission in the frequency domain, and there is no collision between any two transmission patterns.

Hereinafter, a plurality of embodiments will be given to describe the determination of the frequency hopping pattern of traffic data.

PUSCH-like hopping with 4 frequency hopping sub-bands

Figure 5:
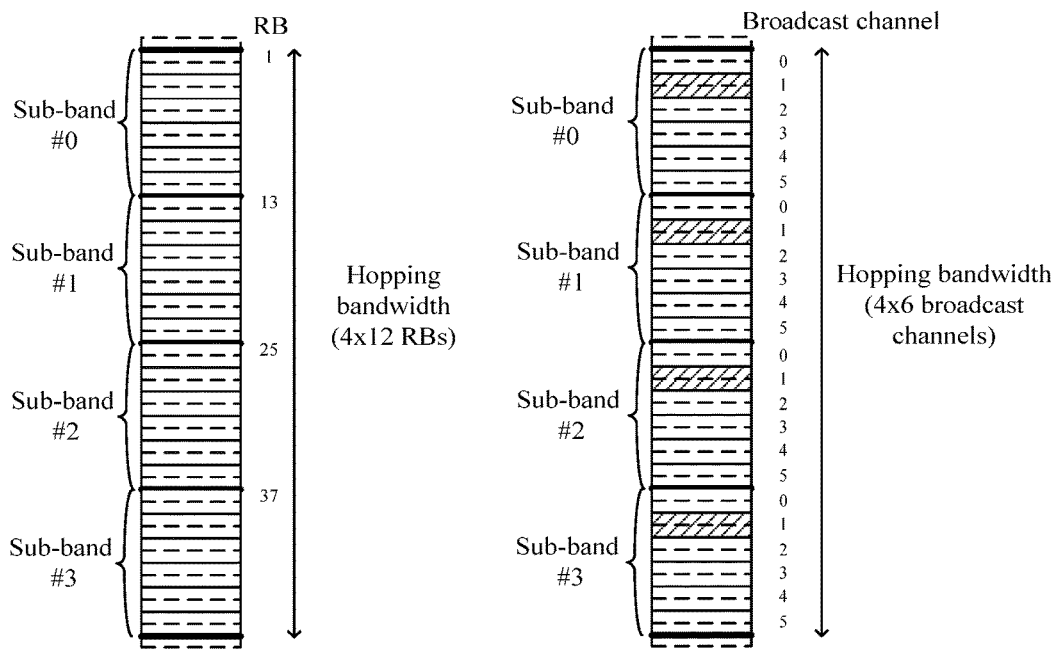
FIG. 5 illustrates a schematic view of a frequency hopping index for 4 sub-bands according to one embodiment of the invention.

In this embodiment, the frequency hopping bandwidth for D2D broadcast communication is divided into 4 sub-bands, as shown in FIG. 5.

Here we use 10 MHz bandwidth as an example. Each sub-band consists of 12 resource blocks. A broadcast data channel (denoted by "" in FIG. 4), which is used to transmit a VoIP packet, is assumed to occupy 2 consecutive RB pairs (i.e., 2RBs×1 subframe). Hence each sub-band consists of 6 broadcast channels, labelled as broadcast channel 0-5.

The frequency hopping patterns satisfy the following rules and characteristics:

1. Both complement transmission pattern subsets and complement transmission patterns are assigned with the same broadcast channel within a sub-band.

1.1 In frequency domain, complement transmission pattern subsets $P_{i,J}$ and $P_{i',J}$ are assigned with the same broadcast channel within a sub-band.

Figures 6, 7:
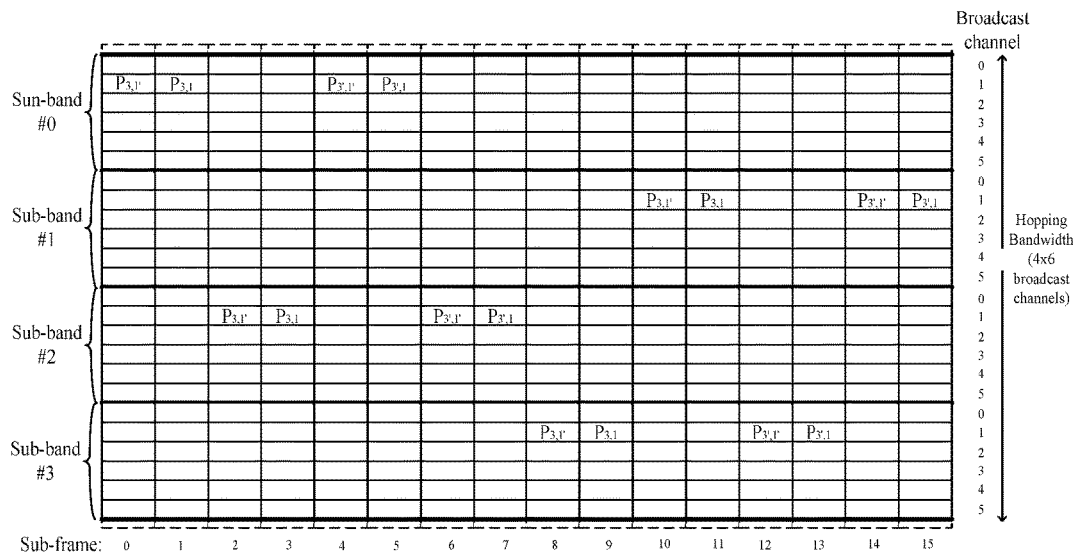
FIG. 6 illustrates a schematic view of a frequency hopping pattern of the complement transmission pattern subset and the complement transmission pattern according to one embodiment of the invention.
FIG. 7 illustrates a schematic view of a Latin square which generates different frequency hopping orders according to one embodiment of the invention.

As illustrated in FIG. 6, complement transmission pattern subsets $P_{3,J}$ and $P_{3',J}$ use broadcast channel 1.

1.2 Within a transmission pattern subset $P_{i,J}$, complement transmission patterns $P_{i,j}$ and $P_{i,j'}$ are assigned with the same broadcast channel within a sub-band. They use the same sub-band for their first transmission and follow the same frequency hopping pattern to hop between sub-bands.

As shown in FIG. 6, for their first transmission (sub-frame 1 for $P_{3,1}$, sub-frame 0 for $P_{3,1'}$), both $P_{3,1}$ and $P_{3,1'}$ transmit at broadcast channel 1 in sub-band 0'. The frequency hopping pattern is sub-band 0->2->3->1.

In time domain, both transmission patterns in complement transmission pattern subsets ($P_{i,J}$ and $P_{i',J}$) and complement transmission patterns ($P_{i,j}$ and $P_{i,j'}$) in an transmission pattern subset don't overlap with each other. Based on this property, all physical sub-frames can be occupied for transmission in time domain and there is no collision between any two patterns.

2. Within a transmission pattern subset $P_{i,J}$, non-complement transmission patterns $P_{i,j}$ and $P_{i,k}$ have the same relative location in each sub-band. However, they use different sub-bands for their first transmission.

Figures 8, 9:
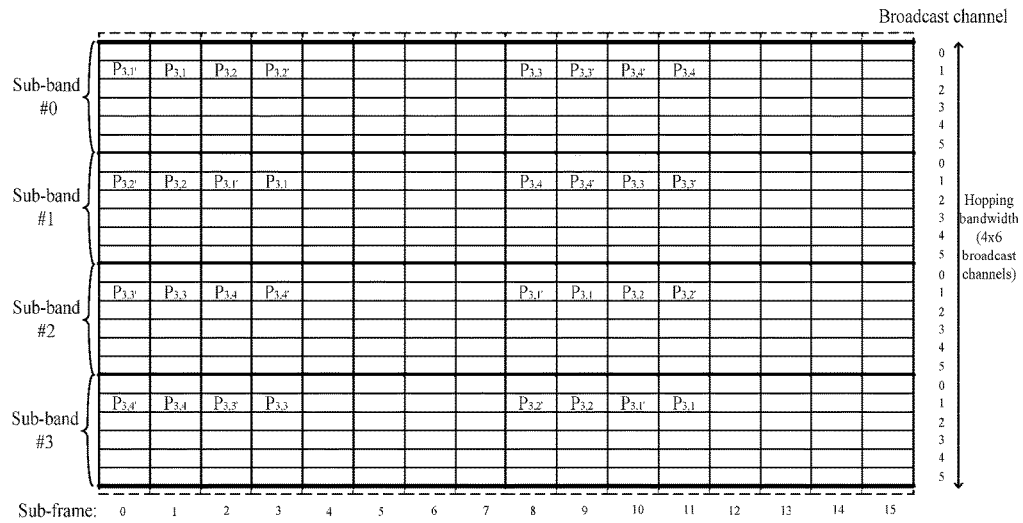
FIG. 8 illustrates a schematic view of a frequency hopping pattern of the non-complement transmission pattern which has different frequency hopping orders according to one embodiment of the invention.
FIG. 9 illustrates a schematic view of a Latin square which generates the same frequency hopping order according to one embodiment of the invention.

As shown in FIG. 8, within transmission pattern subset $P_{3,J}$ {$P_{3,1}$, $P_{3,2}$, $P_{3,3}$, $P_{3,4}$, $P_{3,1'}$, $P_{3,2'}$, $P_{3,3'}$, $P_{3,4'}$} use broadcast channel 1. For their first transmission (sub-frame 1 for $P_{3,1}$, $P_{3,2}$, $P_{3,3}$, $P_{3,4}$), $P_{3,1}$, $P_{3,2}$, $P_{3,3}$, $P_{3,4}$ transmit in sub-band 0, 1, 2, 3 respectively. Similarly, for their first transmission (sub-frame 0 for $P_{3,1'}$, $P_{3,2'}$, $P_{3,3'}$, $P_{3,4'}$), $P_{3,1'}$, $P_{3,2'}$, $P_{3,3'}$, $P_{3,4'}$ transmit in sub-band 0, 1, 2, 3 respectively.

Any Latin square of size 4 (i.e., 4×4) can be applied to construct frequency hopping pattern of this embodiment. A Latin square is an n×n array filled with n different symbols, each occurring exactly once in each row and exactly once in each column. As an example which is shown in FIG. 7, an element in a Latin square denotes which sub-band is used for transmission.

With this assignment, in frequency domain, all sub-bands can be occupied for transmission. And based on the property of Latin square, there is no collision between any two transmission patterns.

With different kinds of Latin squares employed, non-complement patterns $P_{i,j}$ and $P_{i,k}$ can have either different or same frequency hopping orders.

2.1 Different Frequency Hopping Orders

An example of a Latin square which generates different frequency hopping orders is given in FIG. 7. As shown in FIG. 8, the frequency hopping pattern of $P_{3,1}$ is sub-band 0->1->2->3, and the frequency hopping pattern of $P_{3,2}$ is sub-band 1->0->3->2. $P_{3,1}$ and $P_{3,2}$ follow different frequency hopping orders.

2.2 Same Frequency Hopping Order

Figure 10:
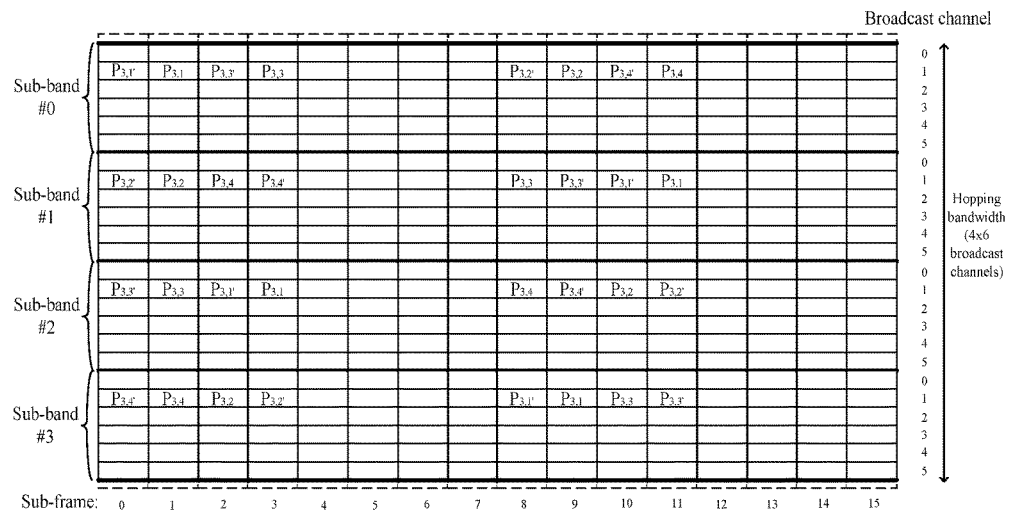
FIG. 10 illustrates a schematic view of a frequency hopping pattern of the non-complement transmission pattern which has the same frequency hopping order according to one embodiment of the invention.

To reduce complexity, non-complement transmission patterns $P_{i,j}$ and $P_{i,k}$ can have the same frequency hopping order. This is also used in existing LTE PUSCH hopping pattern design. An example of a Latin square which generates the same frequency hopping order is given in FIG. 9. As shown in FIG. 10, the frequency hopping pattern of $P_{3,1}$ is sub-band 0->2->3->1, and the frequency hopping pattern of $P_{3,2}$ is sub-band 1->3->0->2. $P_{3,1}$ and $P_{3,2}$ follow same frequency hopping order with different starting sub-bands.

In LTE terminology for PUSCH frequency hopping, the frequency hopping pattern of $P_{3,1}$ is RB 3->27->39->15, and the frequency hopping pattern of $P_{3,2}$ is RB 15->39->3->27. With first transmission as reference, the relative hopping sequence of $P_{3,1}$ is 0->2->3->1, and the relative hopping sequence of $P_{3,2}$ is also 0->2->3->1 (the hopping unit is sub-band). Hence $P_{3,1}$ and $P_{3,2}$ follow same frequency hopping order with different starting sub-bands.

3. Non-complement transmission pattern subsets $P_{i,J}$ and $P_{k,J}$ ($i \neq k$) are assigned with different broadcast channels in a sub-band.

Figure 11:
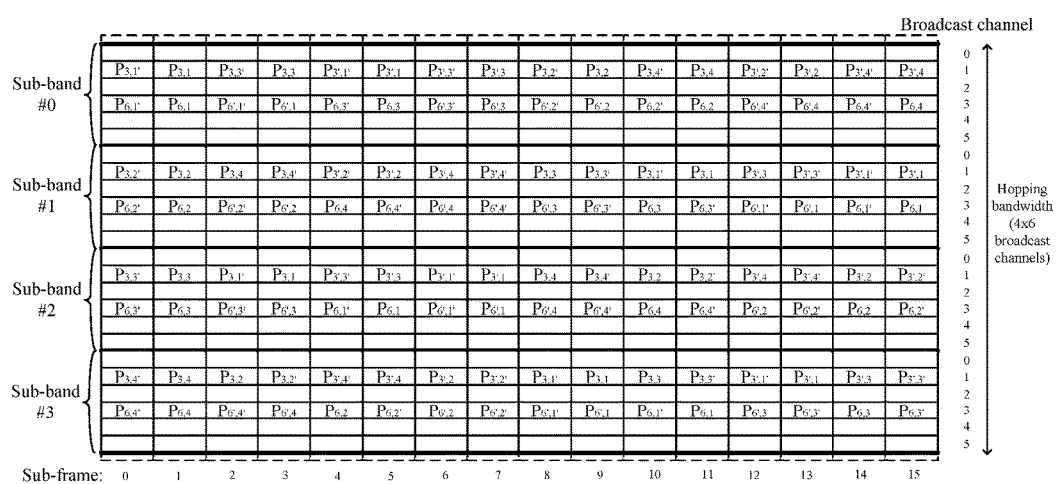
FIG. 11 illustrates a schematic view of a frequency hopping pattern of the non-complement transmission pattern subset according to one embodiment of the invention.

For example, in FIG. 11, transmission pattern subset $P_{3,J}$ uses broadcast channel 1, and transmission pattern subset $P_{6,J}$ uses broadcast channel 3.

With the designed PUSCH-like frequency hopping with 4 sub-bands, all the resources (broadcast channels) for D2D broadcast communication can be used up and there is no collision between patterns.

PUSCH-like hopping with 2 frequency hopping sub-bands

Figure 12:
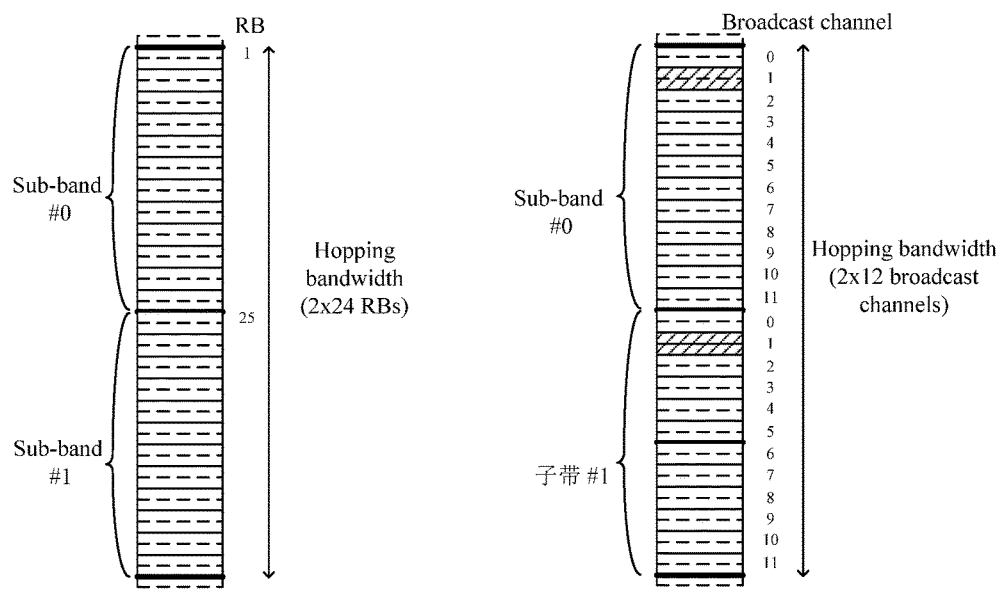
FIG. 12 illustrates a schematic view of a frequency hopping index for 2 sub-bands according to another embodiment of the invention.

In this embodiment, the design is similar as PUSCH-like hopping with 4 sub-bands. The frequency hopping bandwidth for D2D broadcast communication is divided into 2 sub-bands, as shown in FIG. 12. Each sub-band consists of 24 resource blocks. A broadcast data channel (denoted by "  " in FIG. 12), which is used to transmit a VoIP packet, occupies 2 consecutive RB pairs (2RBs×1 subframe). Hence, each sub-band consists of 12 broadcast channels, labelled as broadcast channel 0-11.

The frequency hopping patterns satisfy the following rules and characteristics:

1. Both a part of complement patterns in complement transmission pattern subsets and complement transmission patterns are assigned with the same broadcast channel within a sub-band.

1.1 In frequency domain, a part of complement patterns in complement transmission pattern subsets $P_{i,J}$ and $P_{i',J}$ are assigned with the same broadcast channel within a sub-band.

As there are only 2 sub-bands in this embodiment and VoIP packet is transmitted for 4 times, a part of complement patterns $P_{3,1}$ and $P_{3',1}$ as well as $P_{3,2}$ and $P_{3',2}$ in complement transmission pattern subsets $P_{3,J}$ and $P_{3',J}$ use broadcast channel 2. For another part of complement patterns $P_{3,3}$ and $P_{3',3}$ as well as $P_{3,3}$ and $P_{3',4}$ in complement transmission pattern subsets $P_{3,J}$ and $P_{3',J}$, it is needed to use another broadcast channel, for example broadcast channel 3.

1.2 Within a transmission pattern subset $P_{i,J}$, complement transmission patterns $P_{i,j}$ and $P_{i,j'}$ are assigned with the same broadcast channel in a sub-band. They use the same sub-band for their first transmission and follow the same frequency hopping pattern to hop between sub-bands.

Figure 13:
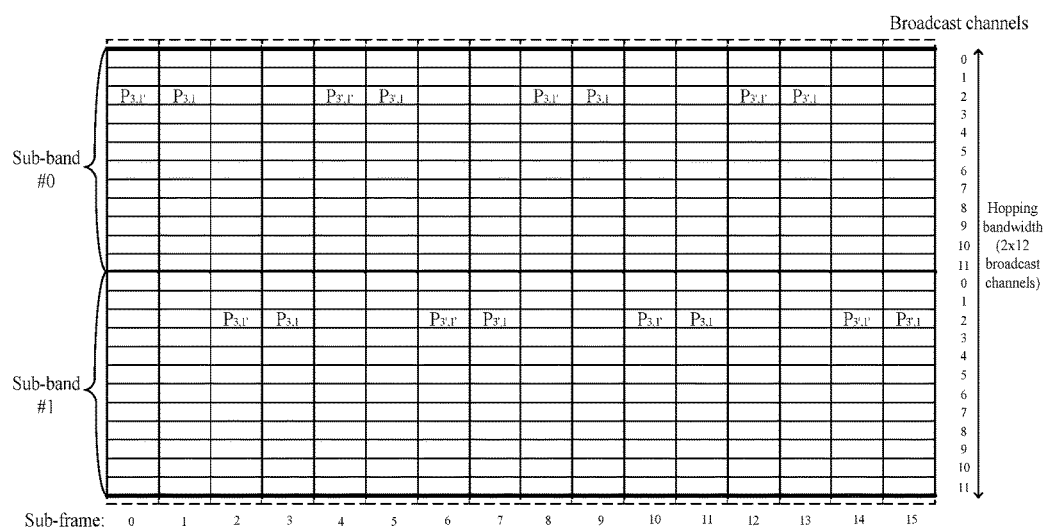
FIG. 13 illustrates a schematic view of a frequency hopping pattern of the complement transmission pattern subset and the complement transmission pattern according to another embodiment of the invention.

As shown in FIG. 13, for their first transmission (sub-frame 1 for $P_{3,1}$, sub-frame 0 for $P_{3,1'}$), both $P_{3,1}$ and $P_{3,1'}$ transmit at broadcast channel 2 in sub-band 0'. The frequency hopping pattern is sub-band 0->1->0->1.

In time domain, both transmission patterns in complement transmission pattern subsets ($P_{i,J}$ and $P_{i',J}$) and complement patterns ($P_{i,j}$ and $P_{i,j'}$) in an transmission pattern subset don't overlap with each other. Based on this property, all physical sub-frames can be occupied for transmission in time domain and there is no collision between any two patterns.

2. Within a transmission pattern subset $P_{i,J}$, a part of non-complement patterns $P_{i,j}$ and $P_{i,k}$ have the same relative location in each sub-band, for example $P_{3,1}$ and $P_{3,2}$ are at broadcast channel 2 in sub-bands 0 and 1 respectively. Another part of non-complement patterns have the same relative location in each sub-band, but differ from the relative location of a part of non-complement patterns $P_{i,j}$ and $P_{i,k}$ in each sub-band, for example $P_{3,3}$ and $P_{3,4}$ are at another broadcast channel in sub-bands 0 and 1 respectively, e.g., broadcast channel 3.

Non-complement patterns $P_{i,j}$ and $P_{i,k}$ use different sub-bands for their first transmission.

Figures 14, 15:
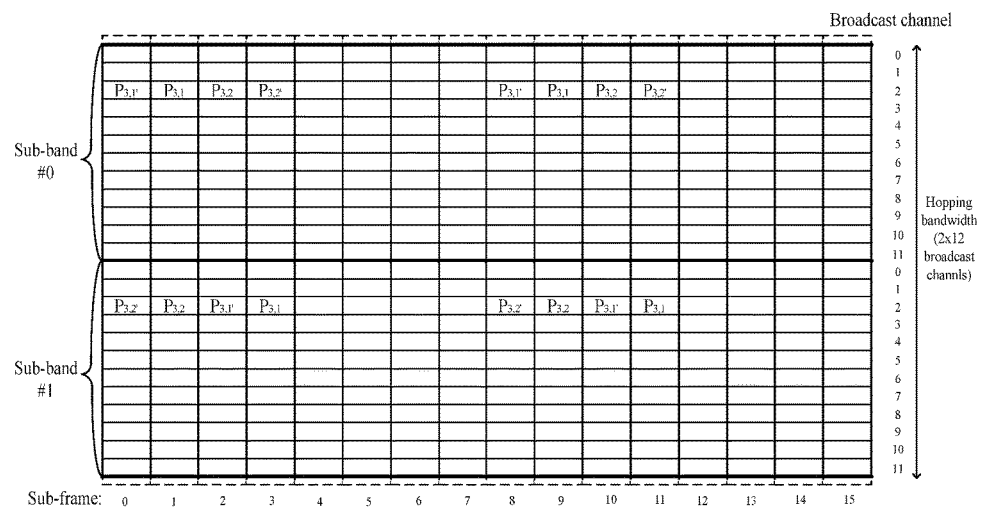
FIG. 14 illustrates a schematic view of a frequency hopping matrix which includes 2 Latin squares according to another embodiment of the invention.
FIG. 15 illustrates a schematic view of a frequency hopping pattern of the non-complement transmission pattern according to another embodiment of the invention.

As shown in FIG. 15, within transmission pattern subset $P_{3,J}$, $\{P_{3,1}, P_{3,2}, P_{3,1'}, P_{3,2'}\}$ use broadcast channel 2. For their first transmission (sub-frame 1 for $P_{3,1}$, $P_{3,2}$), $P_{3,1}$ and $P_{3,2}$ transmit in sub-band 0, 1 respectively. Similarly, for their first transmission (sub-frame 0 for $P_{3,1'}$, $P_{3,2'}$), $P_{3,1'}$, $P_{3,2'}$ transmit in sub-band 0, 1 respectively.

Latin square of size 2 (i.e., 2×2) can be applied to construct frequency hopping pattern. There is only one Latin square of size 2. As an example which is shown in FIG. 14, the frequency hopping matrix consists of two Latin squares of size 2. An element in the frequency hopping matrix denotes which sub-band is used for transmission.

With this assignment, in frequency domain, all sub-bands can be occupied for transmission. And based on the property of Latin square, there is no collision between any two transmission patterns.

3. Non-complement transmission pattern subsets $P_{i,J}$, $P_{k,J}$ ($i \neq k$) use different broadcast channels in a sub-band.

Figure 16:
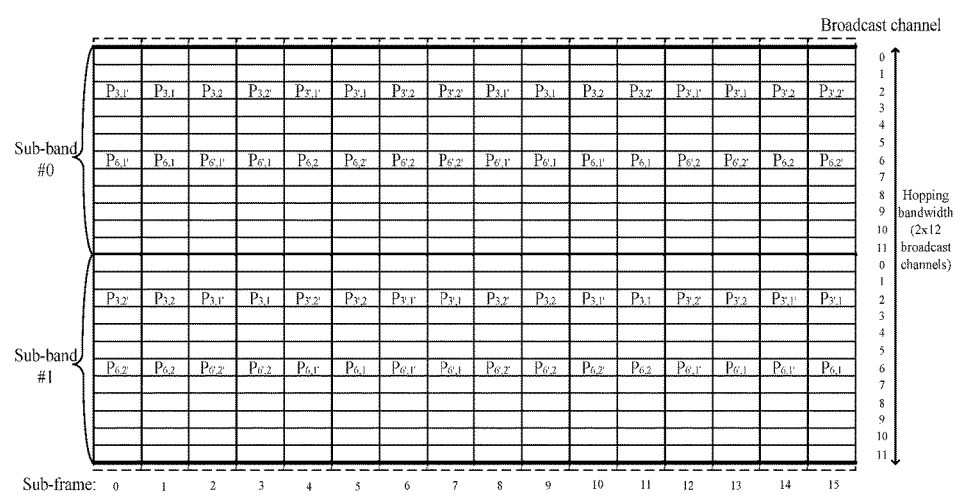
FIG. 16 illustrates a schematic view of a frequency hopping pattern of the non-complement transmission pattern subset according to another embodiment of the invention.

In the example of FIG. 16, transmission pattern subset $P_{3,J}$ uses broadcast channel 2, and transmission pattern subset $P_{6,J}$ uses broadcast channel 6.

With the designed PUSCH-like frequency hopping with 2 sub-bands, all the resources (broadcast channels) for D2D broadcast communication can be used up and there is no collision between patterns.

PUCCH-Like Hopping

In this embodiment, the design is similar as PUSCH-like hopping with 2 sub-bands.

The frequency hopping patterns satisfy the following rules and characteristics:

1. Both a part of complement patterns in complement transmission pattern subsets and complement transmission patterns are assigned with the same broadcast channels.

1.1 In frequency domain, a part of complement patterns in complement transmission pattern subsets $P_{i,J}$ and $P_{i',J}$ are assigned with the same broadcast channels.

Figures 17, 18:
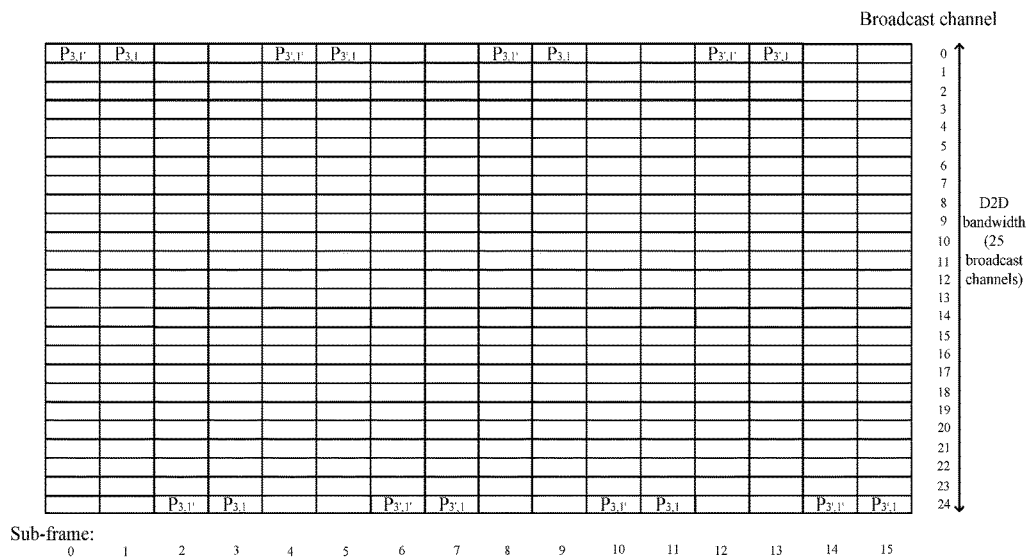
FIG. 17 illustrates a schematic view of a frequency hopping pattern of the complement transmission pattern subset and the complement transmission pattern according to still another embodiment of the invention.
FIG. 18 illustrates a schematic view of a frequency hopping matrix which includes 2 Latin squares according to still another embodiment of the invention.

As illustrated in FIG. 17, a part of complement patterns $P_{3,1}$ and $P_{3',1}$ as well as $P_{3,2}$ and $P_{3',2}$ in complement transmission pattern subset $P_{3,J}$ and $P_{3',J}$ use broadcast channel 0 and 24 at two bandwidth edges.

1.2 Within a transmission pattern subset $P_{i,J}$, complement transmission patterns $P_{i,j}$ and $P_{i,j'}$ are assigned with the same broadcast channels. They use the same bandwidth edge for their first transmission and follow the same frequency hopping pattern to hop between two bandwidth edges.

As shown in FIG. 17, for their first transmission (sub-frame 1 for $P_{3,1}$, sub-frame 0 for $P_{3,1'}$), both $P_{3,1}$ and $P_{3,1'}$ transmit at broadcast channels 0 and 24. The frequency hopping pattern is broadcast channel 0->24->0->24.

In time domain, both transmission patterns in complement transmission pattern subsets ($P_{i,J}$ and $P_{i',J}$) and complement patterns ($P_{i,j}$ and $P_{i,j'}$) in an transmission pattern subset don't overlap with each other. Based on this property, all physical sub-frames can be occupied for transmission in time domain and there is no collision between any two patterns.

2. Within a transmission pattern subset $P_{i,J}$, a part of non-complement patterns $P_{i,j}$ and $P_{i,k}$ have the same relative location in each sub-band. However, they use different bandwidth edges for their first transmission.

Figure 19:
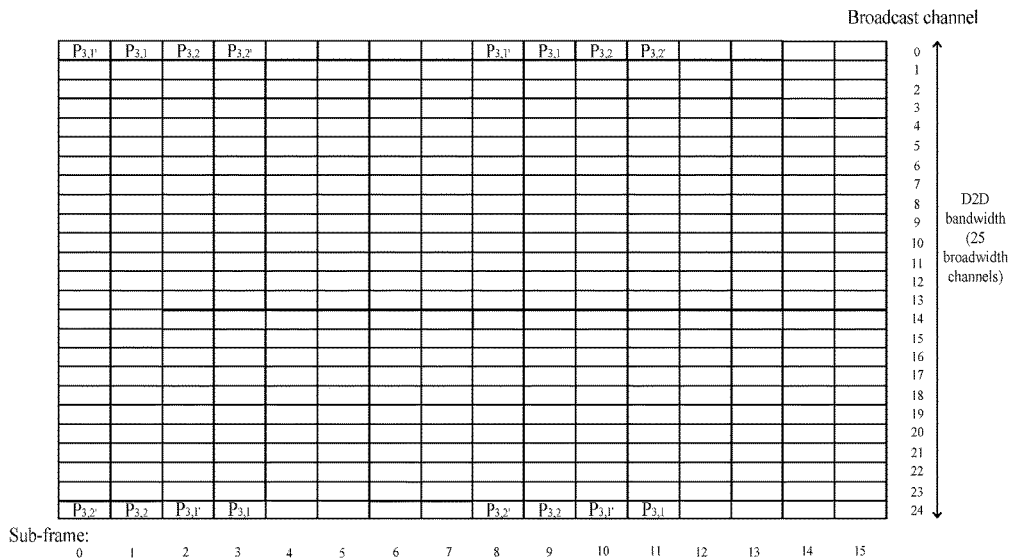
FIG. 19 illustrates a schematic view of a frequency hopping pattern of the non-complement transmission pattern according to still another embodiment of the invention.

As shown in FIG. 19, within transmission pattern subset $P_{3,J}$, $\{P_{3,1}, P_{3,2}, P_{3,1'}, P_{3,2'}\}$ use broadcast channels 0 and 24. For their first transmission (sub-frame 1 for $P_{3,1}$, $P_{3,2}$), $P_{3,1}$ and $P_{3,2}$ transmit in broadcast channels 0 and 24 respectively. Similarly, for their first transmission (sub-frame 0 for $P_{3,1'}$, $P_{3,2'}$), $P_{3,1'}$ and $P_{3,2'}$ transmit in broadcast channels 0 and 24 respectively.

Latin square of size 2 can be applied to construct frequency hopping pattern. There is only one Latin square of size 2. As an example which is shown in FIG. 18, the frequency hopping matrix consists of two Latin squares of size 2. An element in the frequency hopping matrix denotes which bandwidth edge is used for transmission.

With this assignment, in frequency domain, all sub-bands can be occupied for transmission. And based on the property of Latin square, there is no collision between any two transmission patterns.

3. Non-complement transmission pattern subsets $P_{i,J}$, $P_{k,J}$ ($i \ne k$) are assigned with different broadcast channels.

Figure 20:
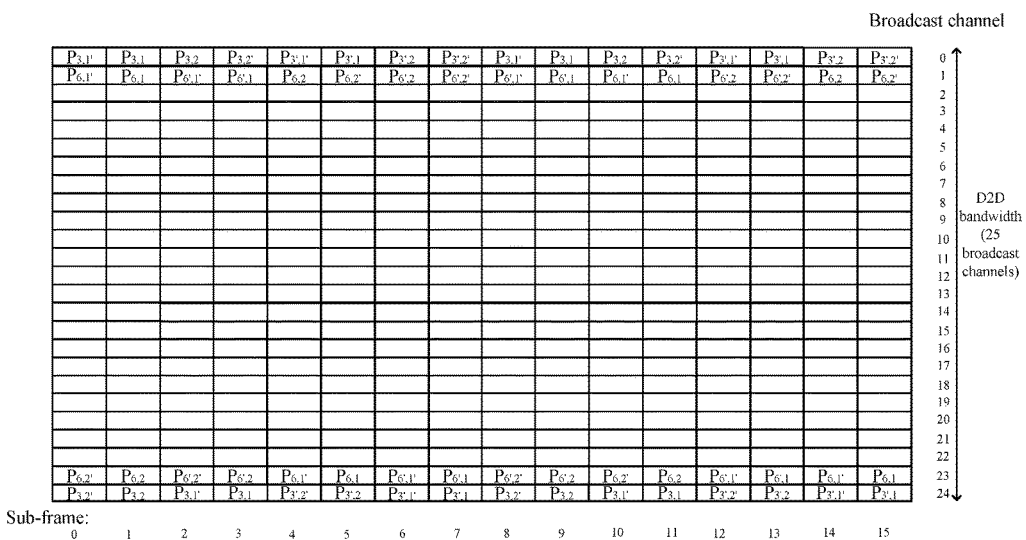
FIG. 20 illustrates a schematic view of a frequency hopping pattern of the non-complement transmission pattern subset according to still another embodiment of the invention.

In the example of FIG. 20, transmission pattern subset $P_{3,J}$ uses broadcast channels 0 and 24, and transmission pattern subset $P_{6,J}$ uses broadcast channels 1 and 23.

With the designed PUCCH-like frequency hopping, as illustrated in FIG. 20, all the resources (broadcast channels) at two bandwidth edges can be used up and there is no collision between patterns.

Figures 21, 22, 23:
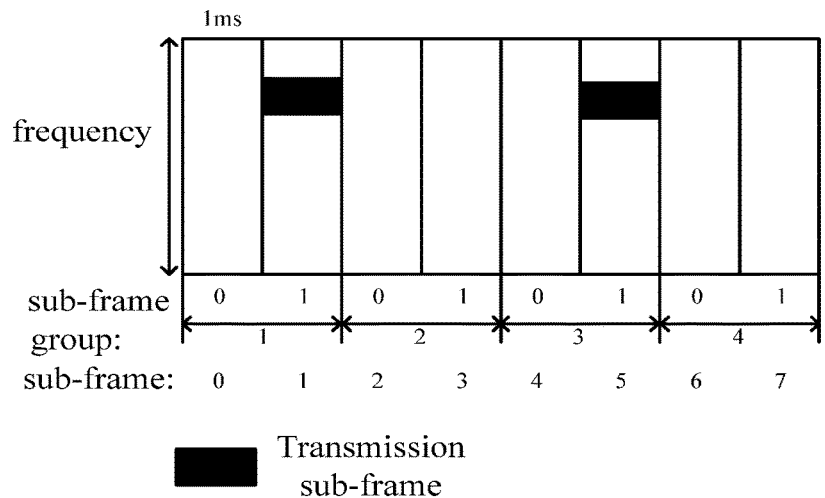
FIG. 21 illustrates a schematic view of a sub-frame group according to another embodiment of the invention.
FIG. 22 illustrates a schematic view of constructing a Walsh matrix-based first transmission pattern set according to another embodiment of the invention.
FIG. 23 illustrates a schematic view of a second transmission pattern set according to another embodiment of the invention.

The size of the exemplary Walsh matrix of the present invention can be set according to the application scenarios, the property of packet transmission and the available number of sub-frames. FIG. 21 shows a schematic view of another transmission sub-frame according to one embodiment of the invention. In FIG. 21, there are 8 sub-frames in total are used for user data transmission. 8 sub-frames are divided into 4 sub-frame groups evenly and each sub-frame group has 2 sub-frames, where each UE can use 2 sub-frames for packet transmission.

The first transmission pattern set includes all rows in the first matrix $W_4$ and the second matrix $W_4'$ except for the first row and the third row. As shown in FIG. 22, both the first matrix $W_4$ and the second matrix $W_4'$ can be 4×4 Walsh matrices. The second matrix $W_4'$ is derived from the first matrix $W_4$ multiplying −1. Except for their respective first row and third row in the first matrix $W_4$ and the second matrix $W_4'$, each element in the first matrix $W_4$ and the second matrix $W_4'$ represents the transmission sub-frame group and the reception sub-frame group. The first transmission pattern set includes the first matrix $W_4$ and the exemplary second matrix $W_4'$, that is, the first transmission pattern set includes 4 kinds of transmission rows in total.

When the value of the second row and first column of the first matrix $W_4$ is 1, its corresponding sub-frame group is the transmission sub-frame group. For another example, when the value of the second row and second column of the first matrix $W_4$ is −1, its corresponding sub-frame group is the reception sub-frame group.

Correspondingly, the second transmission pattern set includes the third matrix $E_2$ and the fourth matrix $E_2'$ as shown in FIG. 23, that is, the second transmission pattern set includes 4 kinds of sub-frame rows in total.

For example, as shown in FIG. 23, the value of the second row and the first column of the third matrix $E_2$ is equal to 1, the sub-frames with index being 1 for example in the corresponding transmission sub-frame group are the transmission sub-frames, while the other sub-frames with index being 0 for example in the transmission sub-frame group are the reception sub-frames. For another example, as shown in FIG. 23, the value of the second row and the second column of the third matrix $E_2$ is equal to 0, the sub-frames with index being 0 for example in the corresponding transmission sub-frame group are the transmission sub-frames, while the other sub-frames with index being 1 for example in the transmission sub-frame group are the reception sub-frames.

The respective rows in the first transmission pattern set and the respective rows in the second transmission pattern set are utilized cooperatively to constitute a whole time-domain transmission pattern set $P_{I,J}$. For example, the first transmission pattern set includes 4 kinds of transmission rows and the second transmission pattern set includes 4 kinds of sub-frame rows; thus the whole time-domain transmission pattern set $P_{I,J}$ includes 16 kinds of time-domain transmission patterns in total.

For the traffic data to be transmitted, UE determines the time-domain transmission pattern $P_{i,j}$ of the traffic data from the whole time-domain transmission pattern set $P_{I,J}$. Wherein, $i \in \{2, 4\} \cup \{2', 4'\}$, $j \in \{1,2\} \cup \{1',2'\}$. If $i \in \{2,4\}$, then the $i^{th}$ row in $W_4$ is used for construction of the time-domain transmission pattern. If $i \in \{2',4'\}$, then the $i^{th}$ row in $W_4'$ is used for construction of the time-domain transmission pattern. Similarly, if $j \in \{1,2\}$, then the $j^{th}$ row in $E_2$ is used for construction of the time-domain transmission pattern. If $j \in \{1'2'\}$, then the $j^{th}$ row in $E_2'$ is used for construction of the time-domain transmission pattern.

In the whole time-domain transmission pattern set $P_{I,J}$, $P_{i,J}$ denotes a transmission pattern subset with i fixed and $J \in \{1,2\} \cup \{1',2'\}$. $P_{i,J}$ and $P_{i',J}$ are complement transmission pattern subsets. Within a transmission pattern subset $P_{i,J}$, $P_{i,j}$ and $P_{i,j'}$ are complement transmission patterns, and $P_{i,j}$ and $P_{i,k}$ are non-complement transmission patterns ($j \ne k$). $P_{i,J}$ and $P_{s,J}$ are non-complement transmission pattern subsets ($i \ne s$).

Hereinafter, the determination of the frequency hopping pattern of the traffic data will be described based on the sub-frame schematic view of FIG. 21 and the constructed first transmission pattern set and second transmission pattern set of FIGS. 22 and 23.

Still referring to FIG. 12, the frequency hopping bandwidth for D2D broadcast communication is divided into 2 sub-bands. Each sub-band consists of 24 resource blocks. A broadcast data channel (denoted by "▨" in FIG. 12), which is used to transmit a VoIP packet, is assumed to occupy 2 consecutive RB pairs (i.e., 2RBs×1 subframe). Hence each sub-band consists of 12 broadcast channels, labelled as broadcast channel 0-11.

The frequency hopping patterns satisfy the following rules and characteristics:

1. Both complement transmission pattern subsets and complement transmission patterns are assigned with the same broadcast channel within a sub-band.

1.1 In frequency domain, complement transmission pattern subsets $P_{i,J}$ and $P_{i',J}$ are assigned with the same broadcast channel within a sub-band.

Figures 24, 25:
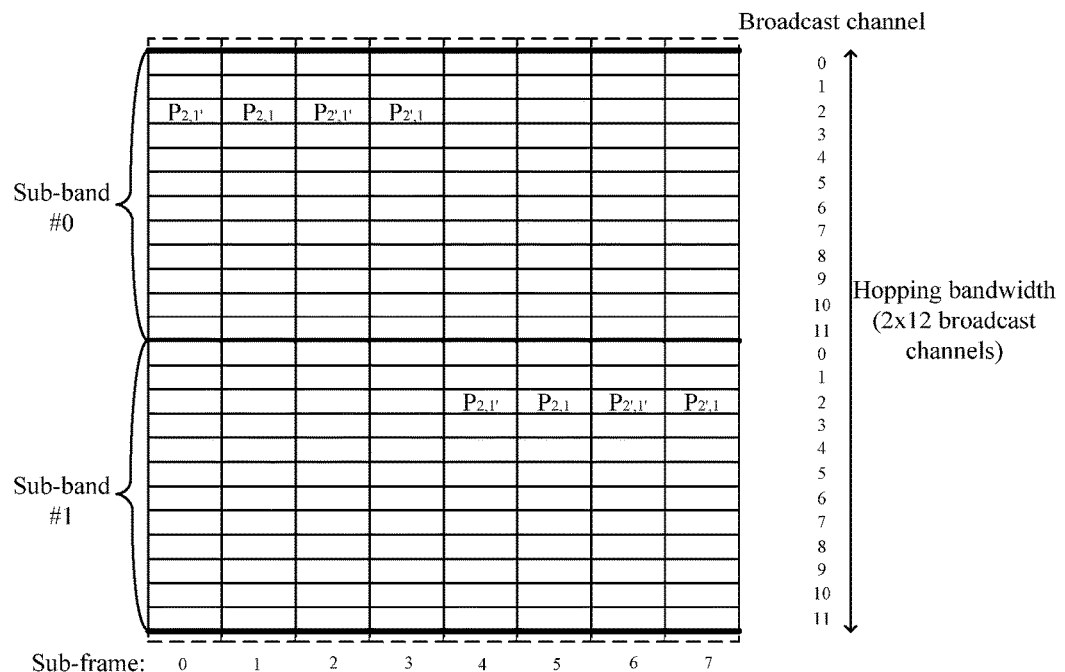
FIG. 24 illustrates a schematic view of a frequency hopping pattern of the complement transmission pattern subset and the complement transmission pattern according to another embodiment of the invention.
FIG. 25 illustrates a schematic view of a Latin square according to another embodiment of the invention.

As illustrated in FIG. 24, complement transmission pattern subsets $P_{2,J}$ and $P_{2',J}$ use broadcast channel 2.

1.2 Within a transmission pattern subset $P_{i,J}$, complement transmission patterns $P_{i,j}$ and $P_{i,j'}$ are assigned with the same broadcast channel within a sub-band. They use the same sub-band for their first transmission and follow the same frequency hopping pattern to hop between sub-bands.

In time domain, both transmission patterns in complement transmission pattern subsets ($P_{i,J}$ and $P_{i',J}$) and complement transmission patterns ($P_{i,j}$ and $P_{i,j'}$) in an transmission pattern subset don't overlap with each other. Based on this property, all physical sub-frames can be occupied for transmission in time domain and there is no collision between any two patterns.

Figure 26:
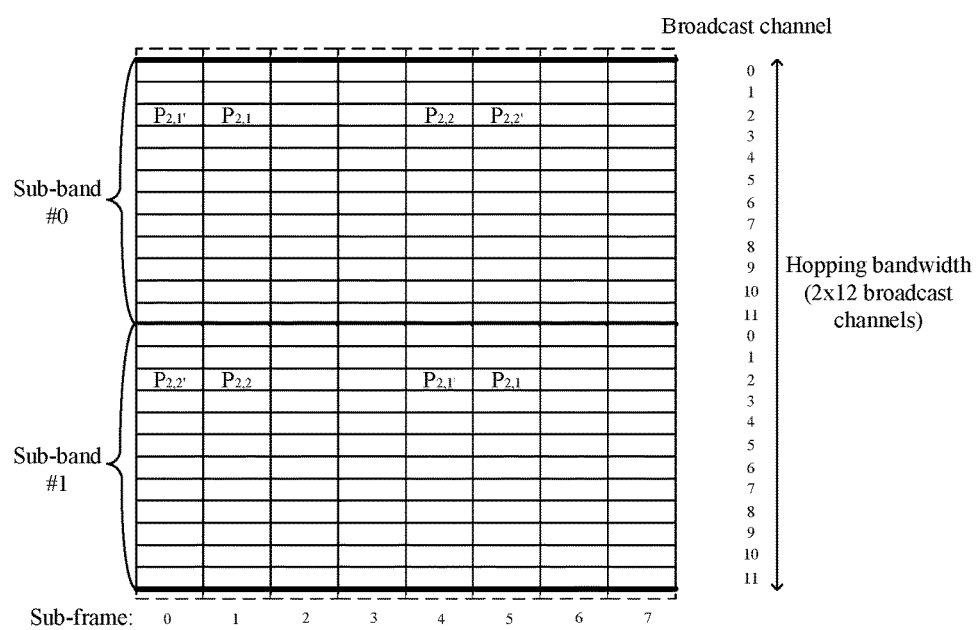
FIG. 26 illustrates a schematic view of a frequency hopping pattern of the non-complement transmission pattern according to another embodiment of the invention.

2. Within a transmission pattern subset $P_{i,J}$, non-complement transmission patterns $P_{i,j}$ and $P_{i,k}$ have the same relative location in each sub-band. However, they use different sub-bands for their first transmission, for example, as shown in FIG. 26.

Latin square (i.e., frequency hopping matrix) of size 2 can be applied to construct frequency hopping pattern of this embodiment. There is only one Latin square of size 2, as shown in FIG. 25. An element in the frequency hopping matrix denotes which sub-band is used for transmission.

With this assignment, in frequency domain, all sub-bands can be occupied for transmission. And based on the property of Latin square, there is no collision between any two transmission patterns.

With different kinds of Latin squares employed, non-complement patterns $P_{i,j}$ and $P_{i,k}$ can have either different or same frequency hopping orders.

3. Non-complement transmission pattern subsets $P_{i,J}$ and $P_{s,J}$ (i≠s) are assigned with different broadcast channels in a sub-band.

Figure 27:
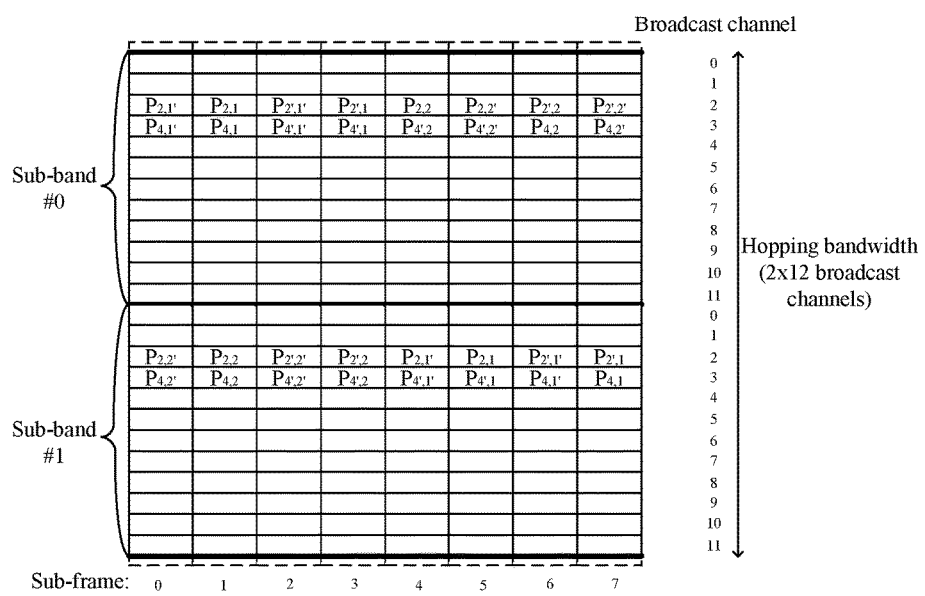
FIG. 27 illustrates a schematic view of a frequency hopping pattern of the non-complement transmission pattern subset according to another embodiment of the invention.

For example, in FIG. 27, transmission pattern subset $P_{2,J}$ uses broadcast channel 2, and transmission pattern subset $P_{4,J}$ uses broadcast channel 3.

With the designed PUSCH-like frequency hopping with 2 sub-bands, all the resources (broadcast channels) for D2D broadcast communication can be used up and there is no collision between patterns.

This embodiment can also be applied to control signaling transmission in D2D broadcast communication. Each network device can choose two transmission patterns which are not overlapped with each other. During each transmission period, the device uses one transmission patterns of the two transmission patterns to transmit control signaling randomly to reduce probability of collision between multiple devices.

In one or more exemplary designs, the functions of the present application may be implemented using hardware, software, firmware, or any combinations thereof. In the case of implementation with software, the functions may be stored on a computer readable medium as one or more instructions or codes, or transmitted as one or more instructions or codes on the computer readable medium. The computer readable medium comprises a computer storage medium and a communication medium. The communication medium includes any medium that facilitates transmission of the computer program from one place to another. The storage medium may be any available medium accessible to a general or specific computer. The computer-readable medium may include, for example, but not limited to, RAM, ROM, EEPROM, CD-ROM or other optical disc storage devices, magnetic disk storage devices, or other magnetic storage devices, or any other medium that carries or stores desired program code means in a manner of instructions or data structures accessible by a general or specific computer or a general or specific processor. Furthermore, any connection may also be considered as a computer-readable medium. For example, if software is transmitted from a website, server or other remote source using a co-axial cable, an optical cable, a twisted pair wire, a digital subscriber line (DSL), or radio technologies such as infrared, radio or microwave, then the co-axial cable, optical cable, twisted pair wire, digital subscriber line (DSL), or radio technologies such as infrared, radio or microwave are also covered by the definition of medium.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any normal processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The above depiction of the present disclosure is to enable any of those skilled in the art to implement or use the present invention. For those skilled in the art, various modifications of the present disclosure are obvious, and the general principle defined herein may also be applied to other transformations without departing from the spirit and protection scope of the present invention. Thus, the present invention is not limited to the examples and designs as described herein, but should be consistent with the broadest scope of the principle and novel characteristics of the present disclosure.

The invention claimed is:

1. A method of determining transmission time-frequency resources of traffic data in a network device of a wireless communication network, the method comprising:

determining a time-domain transmission pattern $P_{i,j}$ of the traffic data from a time-domain transmission pattern set $P_{I,J}$, wherein i∈J, j∈J, $P_{i,j}$ and $P_{i',j}$ are complement transmission pattern subsets, $P_{i,j}$ and $P_{i,j'}$ are complement transmission patterns within the transmission pattern subset $P_{i,J}$, $P_{i,j}$ and $P_{i,k}$ are non-complement transmission patterns within the transmission pattern subset $P_{i,J}$ and j≠k, and $P_{i,j}$ and $P_{s,j}$ are non-complement transmission pattern subsets and i≠s;

determining a frequency hopping pattern of the traffic data based on a frequency hopping matrix and a first rule, wherein the frequency hopping matrix is constructed by one or more Latin squares, a number of rows of the frequency hopping matrix is equal to a number of sub-bands in a frequency hopping bandwidth, each element in a row of the frequency hopping matrix successively represents a frequency hopping order of the complement transmission patterns $P_{i,j}$ and $P_{i,j'}$, a number of columns of the frequency hopping matrix is equal to a number of transmissions of the traffic data, and the first rule is $P_{i,j}$ and $P_{i,j'}$ are assigned with a same channel within a sub-band and a value of j is a part of J or all of J, the complement transmission patterns $P_{i,j}$ and $P_{i,j'}$ in the transmission pattern subset $P_{i,J}$ are assigned with a same channel within a sub-band and use a same sub-band for their first transmission, the non-complement transmission patterns $P_{i,j}$ and $P_{i,k}$ in the transmission pattern subset $P_{i,J}$ have a same relative location in each sub-band and the non-complement transmission pattern subsets $P_{i,J}$ and $P_{s,J}$ are assigned with the different channels within a sub-band; and sending the traffic data according to the time-domain transmission pattern $P_{i,j}$ and the frequency hopping pattern;

wherein i, j, k and s are indices that indicate rows in respective matrices used to represent that transmission pattern, pattern set or pattern subset to which the indices refer.

2. The method according to claim 1, wherein the determining a time-domain transmission pattern comprises:

dividing N sub-frames into M sub-frame groups evenly;

determining a first transmission pattern set, the first transmission pattern set including all rows in a first matrix $H_1$ and a second matrix $H_2$ except for their first rows, wherein the second matrix $H_2$ is a product of the first matrix $H_1$ and −1, and the first matrix has M columns;

determining a second transmission pattern set, the second transmission pattern set including a third matrix $H_3$ and a fourth matrix $H_4$, wherein the fourth matrix $H_4$ and the third matrix $H_3$ are complementary, and each row in the first transmission pattern set and each row in the second transmission pattern set are combined respectively to constitute the time-domain transmission pattern set $P_{I,J}$;

selecting one row from the first transmission pattern set and one row from the second transmission pattern set to determine the time-domain transmission pattern $P_{i,j}$ of the traffic data;

wherein the first transmission pattern set is used for determining transmission sub-frame groups and reception sub-frame groups, and the second transmission pattern set is used for determining transmission sub-frames within each transmission sub-frame group.

3. The method according to claim 1, wherein the non-complement transmission patterns $P_{i,j}$ and $P_{i,k}$ use a same frequency hopping order or different frequency hopping orders.

4. The method according to claim 1, wherein relative locations of frequency hopping of the complement transmission patterns $P_{i,j}$ and $P_{i,j'}$ within each sub-band are same.

5. The method according to claim 1, wherein the frequency hopping matrix and the first rule are pre-configured in the network device.

6. The method according to claim 1, further comprising: sending information about the time-domain transmission pattern $P_{i,j}$ of the traffic data and frequency information about a first transmission of the traffic data to other network devices.

7. The method according to claim 1, further comprising: sending information about the time-domain transmission pattern $P_{i,j}$ of the traffic data and frequency information about each of a plurality of transmissions of the traffic data to other network devices.

8. An apparatus for determining transmission time-frequency resources of traffic data in a network device of a wireless communication network, the apparatus comprising:

a first determining unit for determining a time-domain transmission pattern $P_{i,j}$ of the traffic data from a time-domain transmission pattern set $P_{i,j}$, wherein i∈I, j∈J, $P_{i,j}$ and $P_{i',j}$ are complement transmission pattern subsets, $P_{i,j}$ and $P_{i,j'}$ are complement transmission patterns within the transmission pattern subset $P_{i,j}$, $P_{i,j}$ and $P_{i,k}$ are non-complement transmission patterns within the transmission pattern subset $P_{i,j}$ and j≠k, and $P_{i,j}$ and $P_{s,j}$ are non-complement transmission pattern subsets and i≠s;

a second determining unit for determining a frequency hopping pattern of the traffic data based on a frequency hopping matrix and a first rule, wherein the frequency hopping matrix is constructed by one or more Latin squares, a number of rows of the frequency hopping matrix is equal to a number of sub-bands in a frequency hopping bandwidth, each element in one row of the frequency hopping matrix successively represents a frequency hopping order of the complement transmission patterns $P_{i,j}$ and $P_{i,j'}$, a number of columns of the frequency hopping matrix is equal to a number of transmissions of the traffic data, and the first rule is $P_{i,j}$ and $P_{i,j'}$ are assigned with a same channel within a sub-band and a value of j is a part of J or all of J, the complement transmission patterns $P_{i,j}$ and $P_{i,j'}$ in the transmission pattern subset $P_{i,j}$ are assigned with a same channel within a sub-band and use a same sub-band for their first transmission, the non-complement transmission patterns $P_{i,j}$ and $P_{i,k}$ in the transmission pattern subset $P_{i,j}$ have a same relative location in each sub-band and the non-complement transmission pattern subsets $P_{i,j}$ and $P_{s,j}$ are assigned with different channels within a sub-band; and a first sending unit for sending the traffic data according to the time-domain transmission pattern $P_{i,j}$ and the frequency hopping pattern;

wherein i, j, k and s are indices that indicate rows in respective matrices used to represent that transmission pattern, pattern set or pattern subset to which the indices refer.

9. The apparatus according to claim 8, wherein the first determining unit is used for:

dividing N sub-frames into M sub-frame groups evenly;

determining a first transmission pattern set, the first transmission pattern set including all rows in a first matrix $H_1$ and a second matrix $H_2$ except for their first rows, wherein the second matrix $H_2$ is a product of the first matrix $H_1$ and −1, and the first matrix has M columns;

determining a second transmission pattern set, the second transmission pattern set including a third matrix $H_3$ and a fourth matrix $H_4$, wherein the fourth matrix $H_4$ and the third matrix $H_3$ are complementary, and each row in the first transmission pattern set and each row in the second transmission pattern set are combined respectively to constitute the time-domain transmission pattern set $P_{I,J}$;

selecting one row from the first transmission pattern set and one row from the second transmission pattern set to determine the time-domain transmission pattern $P_{i,j}$ of the traffic data;

wherein the first transmission pattern set is used for determining transmission sub-frame groups and reception sub-frame groups, and the second transmission pattern set is used for determining transmission sub-frames within each transmission sub-frame group.

10. The apparatus according to claim 8, wherein the non-complement transmission patterns $P_{i,j}$ and $P_{i,k}$ use a same frequency hopping order or different frequency hopping orders.

11. The apparatus according to claim 8, wherein relative locations of frequency hopping of the complement transmission patterns $P_{i,j}$ and $P_{i,j'}$ within each sub-band are same.

12. The apparatus according to claim 8, wherein the frequency hopping matrix and the first rule are pre-configured in the network device.

13. The apparatus according to claim 8, wherein the first sending unit is further used for sending information about the time-domain transmission pattern $P_{i,j}$ of the traffic data and frequency information about a first transmission of the traffic data to other network devices.

14. The apparatus according to claim 8, wherein the first sending unit is further used for sending information about the time-domain transmission pattern $P_{i,j}$ of the traffic data and frequency information about each of a plurality of transmissions of the traffic data to other network devices.

* * * * *